July 24, 1956  J. W. EYESTONE  2,756,153
PREPARATION OF ICE CREAM
Filed March 29, 1954
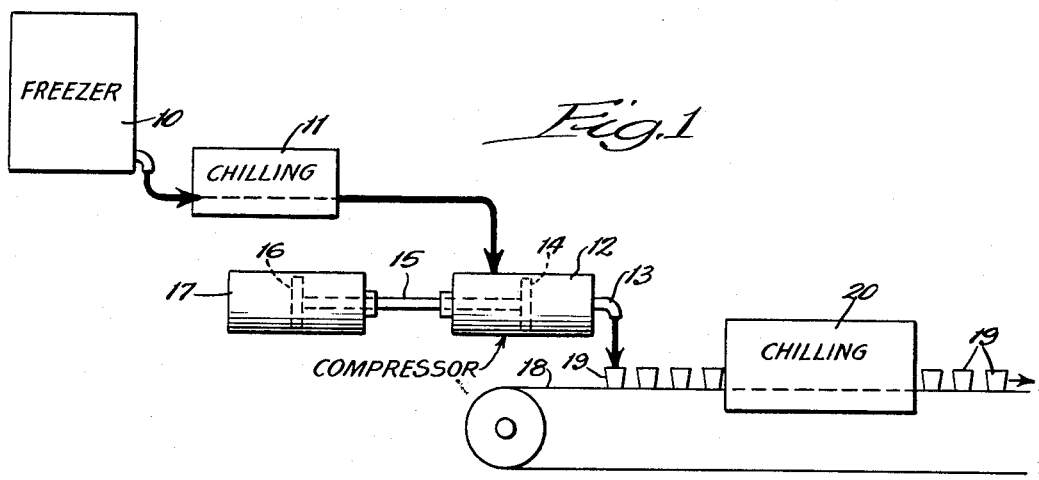
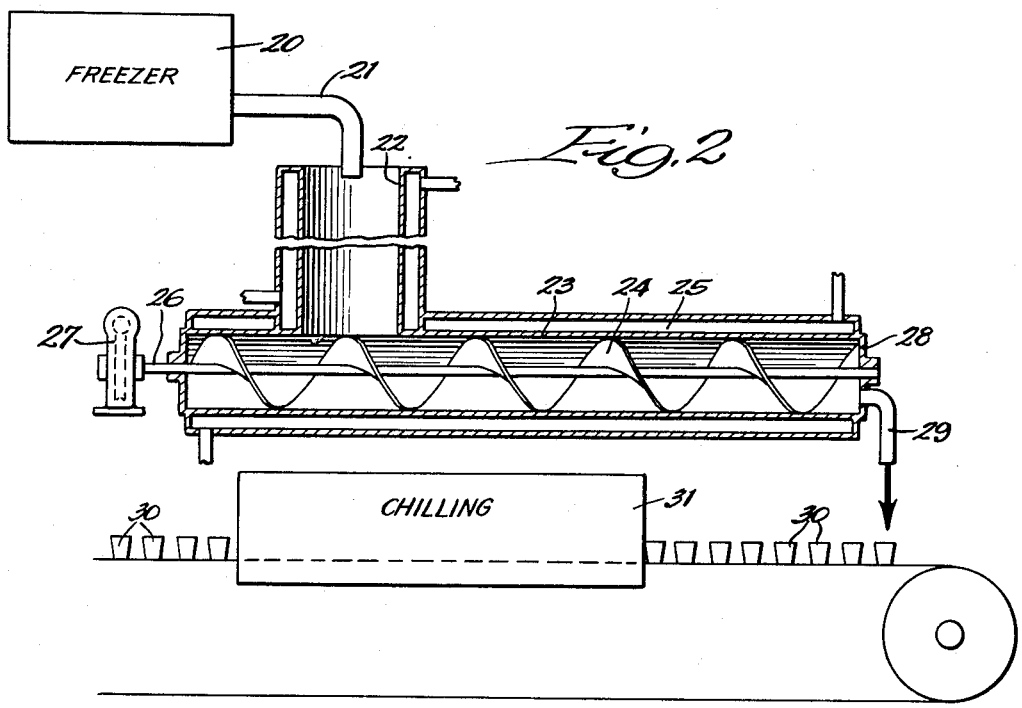
INVENTOR:
John W. Eyestone,
BY Dawson, Tilton & Graham
ATTORNEYS.

2,756,153
PREPARATION OF ICE CREAM

John W. Eyestone, Aberdeen, S. Dak.

Application March 29, 1954, Serial No. 419,430

3 Claims. (Cl. 99—136)

This invention relates to the preparation of ice cream. The invention is useful in the preparation and storing of ice cream, including such frozen confections as custards, iced milk, desserts, sherbets and ices, and other types of foods generally included under the broad term "ice cream."

The present application is a continuation-in-part of my co-pending application, Serial No. 371,333, filed July 30, 1953, which, in turn, is a continuation-in-part of my co-pending application, Serial No. 255,959, filed November 13, 1951.

In the manufacture of ice cream, it is common to prepare an ice cream mix which may include various nutrients such as milk solids, non-dairy solids including cereal solids or mixtures of such solids, fats, sugars, flavoring, stabilizer emulsions, etc. The mixture is agitated under low temperatures and then extruded or discharged from a freezer or other vessel into packages or other small containers. The product is then hardened in a tunnel or other freezing compartment at low temperatures of about minus 20° F. to minus 60° F., more or less.

The packages are shipped to consumer outlets, where they are kept in refrigerators or self-service refrigerator compartments. The consumer, after buying the packaged ice cream, places it in his refrigerator and later the ice cream is served from the package to dishes for the table.

It is found that the ice cream produced according to the above standard practice soon undergoes a change after leaving the plant and while being stored in refrigerator trucks or in the self-service refrigerators, and particularly when the same is placed within the consumer's refrigerator, where the temperature is usually about 15° F. Even though the ice cream is kept within its original container, under the influence of the higher temperature, the ice cream, while tending to keep its form, becomes porous, somewhat grainy, and frothy. The product is much less palatable. Upon exposure to room temperatures, the ice cream tends to lose its shape and melts, non-uniformly.

I have discovered that the undesirable effects described above are due to the crystal structure of the ice cream and that such defects can be overcome by destroying the crystal structure, as by kneading the ice cream when the crystals are hard to shatter them, and then subjecting the mass to a very low temperature for setting the mixture in this condition. If the ice cream is simply compressed in one direction, the crystal structure, while partly shattered, remains in horizontal strata, and the ice cream appears to be still subject to the disadvantages described above. However, by kneading the ice cream thoroughly after the crystals have become hard so as to shatter the crystals into fragments and mix the fragments thoroughly with the colloidal mass, and by then freezing the mass at temperatures well below zero before reknitting or recrystallizing can occur, an excellent product is obtained, free of the objections set out above.

An object of the present invention is to produce an ice cream product of greater palatability and greater stability under the shipping and storing conditions described above. A still further object is to provide a method for producing ice cream which causes the ice cream to keep its form and which does not become porous or frothy under storage conditions in a consumer's refrigerator at temperatures around 15° F. A still further object is to produce an "ice cream" product which remains more firm and solid under temperature conditions at which ice cream packaged under old processes tends to flow, while at the same time melting readily at room temperature and quickly releasing the full taste and flavor to the taste buds for a fuller and greater appreciation of the blend of ingredients and a greater refreshment due to the intensified cold sensation. A still further object is to provide an "ice cream" product in which the crystalline structure is disturbed or modified to produce a dispersion of the colloidal mixture of fats and solids, thus creating a relatively homogeneous mass in which the colloid body mixes uniformly with the shattered crystalline structure. Other specific objects and advantages will appear as the specification proceeds.

In one embodiment of the invention, the crystalline mixture, after being hardened to produce a crystalline body, is worked or kneaded to break the crystals into fragments and the fragments are then mixed with the colloidal film or body consisting of fats, milk solids, sugar, flavoring and other material. This colloidal mass is spread through the fractured crystals so as to encompass or surround them. Thus the colloidal material, instead of being pocketed in a crystalline structure, is now released from the pockets and spread through the mass of shattered crystals so as to enclose them. Then, when the entire mass is subjected to low temperatures, well below zero, the mass becomes hard, reknitting of the crystal fragments is prevented, and the structure is set in the desired condition in which the fractured crystals are disseminated in random arrangement throughout the colloidal mass. Later, when the ice cream is subjected to a rising temperature to bring about melting, it is found that the material resists the higher temperatures for a much longer period than ice cream produced under the old methods, and it finally melts as a complete body and as a homogeneous mass.

While the compacting or shattering of the crystal may be produced by simple mechanical pressure, it is also possible to bring about this change through other methods which tend to disintegrate the crystals. For example, extreme vibrations produced by a vibratory device at sonic or supersonic and subsonic ranges, are effective for breaking up the crystal structure and causing the colloidal body to spread and mix with the other crystals.

As a specific example of the process, I prefer to lower the temperature of the soft frozen mass from the freezer to a sufficient degree, above zero, where the crystals become hard frozen and are substantially fully developed. The crystals in this brittle condition may be readily fractured and in the fracturing operation the broken crystals are mixed with the colloidal mass. If desired, a specific mixing action may accompany the fracturing of the crystals. Excellent results have been obtained when the soft frozen material from the freezer, which is usually at a temperature of about 20° F., is brought to a temperature of 5 to 12° F. The mass is then subjected to an action which breaks the crystals uniformly therethrough, as, for example, where the crystal mass is forced under pressure through an orifice, or where the mass is worked under pressure by a screw. By operating in this manner, substantially no liquefying of the material occurs because the temperature of the mass is not raised and, instead, a relatively quick fracturing and mixing of the crystals occurs immediately after they are hard frozen. After the fracturing step, the temperature of the material is brought promptly down to a temperature below zero and preferably into the range of minus 20 to minus 30° F. By bringing the temperature of the material below zero at least, I find that the mixture is set in the desired condition in which the crystal fragments are dispersed through the colloidal mass and the material is preserved in this desired condition until it is ready for sale or use.

The foregoing process is particularly effective in that it brings about a uniform fracturing of the crystals across the body of the material so that a uniform product results and causes the substantially ideal condition which occurs after the immediate fracturing of the crystals is captured and held by the solid or hard freezing step in which the temperature is brought below zero.

The process may be carried on in a variety of different types of apparatus, which will vary according to the results desired, but, for the purpose of illustration, certain embodiments of the process may be carried on in the apparatus illustrated in the accompanying drawing, in which—

Figure 1 is a diagrammatic view of apparatus which may be employed in the carrying out of my process; and Fig. 2, a vertical sectional view of apparatus which may be employed in the continuous kneading or working of the hard-frozen material and illustrating a modified form of the invention.

In the operation of the process as shown in Fig. 1, 10 designates a conventional freezer of any suitable type and from which a soft frozen ice cream is discharged. The soft frozen ice cream consists of the colloidal mixture together with a large number of said crystals which give the material its semi-solid appearance. The crystals are nascent or incipient crystals that are fragile in character, and for that reason, the ice cream product is usually referred to as "soft frozen."

The soft frozen ice cream from freezer 10 is then passed through a chilling or freezing tunnel 11, which is well known in the art. It is common to employ a freezing compartment rather than a freezing tunnel, and it will be understood that either of these methods for the freezing of the soft frozen material may be used, and the showing of the tunnel 11 is merely for the purpose of illustration. The soft frozen ice cream is subjected in the tunnel or hardening compartment to temperatures sufficient to hard freeze the ice cream mixture. The temperature at which such hard freezing occurs will vary with the type of material which is being frozen and its ingredients, but usually such hard freezing occurs within the range of zero to 15° F. The hard freezing is complete when the crystals become substantially fully developed and are brittle in character so that under later further chilling conditions and in a later step of the process, further crystal growth will not be substantial. In other words, it is desired in the chilling apparatus referred to by the numeral 11 to substantially complete the crystal growth within the mass and to bring the crystals to a brittle condition where they may be readily shattered.

From the hard freezing station 11, the material passes to an orifice-equipped compressor 12, which may be of any suitable structure. In the illustration given, I provide a cylinder equipped at its outlet end with a reduced discharge pipe 13 forming an orifice through which the mass of material is discharged. A piston 14 is driven by a shaft 15 connected at its inner end to a piston 16 mounted within a compressed air cylinder 17. In the diagrammatic showing, the cylinder 12 is indicated as having an opening in the top thereof to receive the hard frozen material to substantially fill the forward portion of the cylinder 12. The piston then carries the hard frozen material forwardly, forcing it through the reduced diameter orifice at the end of the cylinder and through the discharge pipe 13. This action places great pressure upon the crystal mass across its entire face, causing the crystals to be broken into fragments and to be mixed with the colloidal material then passing through the discharge pipe 13.

A conveyor 18 of a conventional type is provided for carrying containers 19 after they are filled through a second chilling tunnel 20 or hardening compartment, whichever is desired, to bring the temperature of the ice cream material below zero and preferably to a temperature in the neighborhood of minus 25° F. This last step sets the mass in the desired condition in which the crystal fragments are interspersed uniformly in and through the coloidal mass and the mixture is thus held in a solid condition until ready for sale or consumption.

Comparing the hard frozen ice cream received from the tunnel 20 with the ordinary ice cream heretofore produced in conventional equipment, I note the following differences: In the conventional equipment, the ice cream is drawn from the freezer at temperatures varying from 18 to 24° F., with little, if any, free liquid. The water, sugar, fat, solids, and other ingredients are in stiff-emulsion form and carrying aeration, which provides the overrun. This emulsion contains multitudes of soft, amorphous, or seed crystals with a more or less undefined shape and as a component of the mass. The mass is then frozen at a very low temperature, in the neighborhood of minus 25° F., and this operation sets up a general structure which retains the air of the mix. The crystals grow and develop within the mass and appear to be surrounded by a film on the remaining ingredients which, as the crystal develops by taking out liquid from this surrounding material, becomes drier. Since there are multitudes of said crystals developing, the final hardened mass is, in effect, a mass of crystals encased in film varying in size and surrounding moisture content depending upon the temperatures and original composition of the mix. The product is most satisfactory for serving at 6 to 10° F. The aerated film encasing or surrounding the crystals seems to act as an insulator, so that as the temperature is raised to provide a severable product, the conduction is not good and the mass, instead of melting uniformly throughout, warms up from the outside, and with the film doubtless unable to absorb the liquid from the melting of the crystals and to reconstitute itself, there is not obtained a generally homogeneous and even-temperatured product which releases its full flavor to the taste buds.

In contrast, the hard frozen product leaving tunnel 20 of the new process retains the ice cream mixture in the condition in which the crystals have been fractured and mixed with the colloidal mass, and it constitutes a homogeous product which retains its character. The shattering of the crystal structure and breaking up of the surrounding film composed of the remaining ingredients prevents such film from acting as an insulator to the crystals and sets up conduction, so that heat and cold pass more uniformly through the mass so that a uniform melting of the ice cream body takes place. The surrounding ingredients released from their film and the colloid structure, take on a permanent liquid form. Instead of an ice cream mixture consisting of a crystalline network about which the other ingredients form a film or body, we have in the finished product from the new process described a homogeneous body in which the crystals are in shattered form and are distributed in a random arrangement through the colloidal body. The product retains its character and palatability when stored in an ordinary refrigerator at 15° F. for a much longer time than does the ice cream of the prior practice. Further, the new product appears to be heavier in consistency and appears to be colder to the taste buds and is much more palatable.

In the modification shown in Fig. 2, the freezer 20 discharges soft frozen ice cream through the pipe 21 into a jacketed receiver 22. The jacketed receiver 22 may be provided with coils through which refrigerant is circulated or with any other means for the chilling of the receiver so that the soft frozen ice cream soon reaches a low temperature. The drawing is diagrammatic and it will be understood that the length of the receiver 22 may vary. It is desired to deliver into the longitudinal conduit 23 therebelow ice cream which is substantially hard frozen, or nearly hard frozen, and in a desired condition for working by the screw 24. The conduit or tube 23 is also provided with a jacket 25 and may be equipped with coils or other means for recirculating refrigerant about the conduit for the further chilling of the ice cream content. The screw 24 is mounted upon a shaft 26 driven by a motor through a reducing gear 27 and is effective in moving the frozen ice cream forwardly to the end 28 of the conveyor and thence out through a discharge pipe 29 into receptacles 30. The receptacles 30, which contain the kneaded ice cream in which the hard crystal fragments are intermixed with the colloidal material, then pass through the chilling tunnel 31 or freezing compartment for a further reduction of temperature.

An important phase of the invention is the providing of a working or kneading action which produces a relocation and redispersion of the crystals and other ingredients so as to form a homogeneous mass with each portion in intimate relation with the other. The final product resists graininess and frothiness at temperatures of 20° above zero and, when eaten, is noticeable by reason of the extreme cold sensation which adds to the flavor and palatability of the product. The product better resists fluctuations of temperatures to which ice cream products are constantly exposed in their normal merchandising routine, namely, in movement from the hardening room to the truck, from the truck to the merchandising cabinet, and from the cabinet to the home refrigerator.

In the operation of the structure shown in Fig. 2, it will be noted that the ice cream which is soft frozen in freezer 20 is hard frozen by the time it is received within the conduit 23 or shortly thereafter, and thus the crystals are in final condition for fracturing, having reached substantially their maximum growth. Hence the working of the screw 24 within the hard material effectively breaks the crystals into relatively small fragments and at the same time works the fragments into the mass of colloidal material to disperse them in random arrangement through the material. If desired, the worked material may be discharged from the forward end of the container 23 directly into receptacles or outlets without any further fracturing operation. In the illustration given, however, I provide a reduced orifice outlet 29 which produces a further shattering of the crystals so that further reworking takes place within the discharge conduit 29. The thoroughly-kneaded ice cream, having the hard crystal fragments therein dispersed throughout the body of the material, fills the containers 30 and the containers then pass through a chilling tunnel 31 or a hardening room where they are brought down to very low temperatures so as to set the material in place and before any reknitting of the crystal fragments can occur.

The soft frozen ice cream, instead of being hardened in the particular apparatus shown, may be hardened within a tunnel or hardening room to hard freeze the ice cream mixture. The temperature at which such hard freezing occurs will vary with the type of material which is being frozen and its ingredients, but usually such hard freezing occurs within the range of zero to 15° F. The process, however, may be carried out a few degrees below zero, if this is desired. The hard freezing is complete when the crystals become substantially fully developed and are brittle in character so that under later chilling conditions further crystal growth will not be substantial. In other words, it is desired in the chilling apparatus referred to, to substantially complete the crystal growth within the mass and to bring the crystals to a brittle condition where they may be readily shattered.

Specific examples of the process may be set out as follows:

*Example I*

A standard ice cream mix containing milk solids, sugar and flavoring was agitated and introduced into an extrusion freezer, where it was brought to a temperature of about 22° F. The ice cream product thus soft frozen was extruded from the freezer with an overrun of 100, at a temperature of 22° F. into large containers and then chilled within a hardening room to a temperature of 10° F. The hard frozen material was then introduced into a cylinder having an opening in the upper portion thereof to receive the ice cream and a piston was forced against the ice cream to cause it to be discharged through a two-inch orifice in one end of the cylinder, the diameter of which was approximately six inches. The ice cream was discharged from the orifice into gallon containers, which were then passed through a hardening room to bring the temperature to about minus 20° F. The product, when later tested, after remaining in a refrigerator at 15° F., was not frothy, porous or grainy, but was compact, homogeneous, and retained its complete flavor, quickly releasing the full taste and flavor to the taste buds of the blend of ingredients, the taste being enhanced by the intensified cold sensation.

*Example II*

The process was carried out as in Example I, except that the material had an overrun of 120 and was first hard frozen to a temperature of 6° F. and subjected to the action of the orifice at substantially that temperature. The product had an excellent taste, retained its shape at a temperature of 15° F. after four days of storage, and did not become grainy, porous or frothy.

*Example III*

A standard ice cream mix containing milk solids, fats, sugar, and flavoring was agitated and introduced into an extrusion freezer where it was brought to a temperature of 20° F. with an overrun of 100. The ice cream product was hard frozen to a temperature of 10° F. and worked within a cylinder equipped with a screw so as to fracture the crystals, the final product being extruded through a two-inch orifice into containers which were then passed into a hardening room and subjected to a temperature of minus 60°. The product, after remaining in a refrigerator at 20° F., was not frothy, porous or grainy, but was compact, homogeneous, and retained its complete flavor, and the cold taste was readily detectable.

*Example IV*

The container 22 was filled with ice cream extruded from a freezer maintained at 22° F., the ice cream having an overrun of 85%. The soft frozen material from the freezer was hard frozen at 12° F. The container was placed within a vibrating machine and vibrated at a rate of about 1000 vibrations per minute. The product was found to settle, the crystalline structure being broken, and the colloidal material, consisting of fat, milk solids, etc., was found to be dispersed through the mass and about the broken crystals. The product had a uniform texture, retained its form, and was not porous, frothy or grainy after ten days of storage in a refrigerator at 15° F.

*Example V*

Custard extruded from a freezer maintained at about 22° F. was subjected to freezing temperatures at about 15° F. in order to set up a hard crystal structure. The frozen custard was then placed within a cylinder in which a screw was mounted and the screw was rotated to work the material and break the crystal mass. The product was then passed through a freezing tunnel to bring the temperature to 5° below zero. The product, after several days of storage in a refrigerator at 15° F., was found to be uniform in texture and was not porous, grainy or frothy.

Example VI

Ice cream was discharged from a freezer in soft frozen condition so that it fell in a thin ribbon-like body through a refrigerated tunnel and into an orifice-equipped compressor. The temperature of the ribbon of ice cream almost reached zero prior to its being received within the orifice-equipped cylinder. The cylinder was six inches in diameter and the orifice was two and one-half inches. When the cylinder was substantially filled, a piston was advanced to compact the material and to force it through the orifice, the ice cream within the cylinder at this time having a temperature above zero and approaching 6° F. The material passing from the orifice was immediately frozen at a temperature of 10° below zero, and when the product was finally tested after storage in a refrigerator for three days at a temperature of 15° F., it was found that the product was uniform in character, retaining its shape and giving a cold sensation to the tongue much greater than the cold sensation of ordinary ice cream stored under the same conditions.

Tests similar to the above but treating iced milk, custards and sherbets gave similar results.

The operations herein described may be batch operations, or may be continuous, as desired. By bringing the soft frozen material quickly to a hardened condition in which the crystals are substantially fully developed and then fracturing them and mixing the fragments with the colloidal mixture, without liquefaction occurring, and then setting the mass, which is now substantially uniform in cross section with the crystal fragments dispersed in random arrangement throughout the colloidal material, consisting of milk solids, non-dairy solids, including cereal solids and mixtures thereof, fats, including vegetable and butterfats and all kinds of fats, sugars, flavoring, emulsions, etc., and by dropping the temperature well below zero, it is found that a greatly improved ice cream product is obtained, as shown by the foregoing description and examples.

Example VII

Ice cream was discharged from a freezer into a paper container and the ice cream and container were frozen to a hardened condition at a temperature of 10° F. A vertically-mounted shaft above the ice cream container was lowered under pressure. The shaft carried a plurality of solid plungers about three-eighths of an inch in diameter. The plungers were forced downwardly repeatedly into the frozen material. This action not only shattered the crystals within the ice cream mass, but also forced the material laterally out of the path of the spaced plungers so as to create a kneading action of the frozen material. If desired, the material may be forced back into the spaces left by the plungers by the use of a presser piston or by pressing the material within a telescoping container. The product was found to have the advantages described in the foregoing examples. It will be obvious that various means may be used for kneading the ice cream while at the same time shattering the crystals therein so as to disperse the shattered crystals in unoriented or random arrangement within the kneaded mass.

While the temperatures employed will vary somewhat according to the different ingredients that may be employed, I find that generally the hard frozen condition at which the crystals should be fractured is obtained at temperatures of about minus 5° to plus 12° F., and I prefer to fracture the material at temperatures of about minus 5 to 10° F. It is important that the hard frozen material be kneaded or worked so that the crystals are not only fractured, but are mixed thoroughly with the colloidal material. I find that simple compression of the ice cream mass results in a flattening of the crystal strata which remains still effective for giving the undesirable results heretofore mentioned, namely, the production of graininess or frothiness, etc., when the material is stored in a refrigerator at temperatures of about 15° F. By kneading the material, however, and then, before there is an opportunity for the fractured crystals to reknit or to reform in a crystal structure, setting the material by further freezing, an excellent product is obtained. As already stated, the final freezing step should be below zero and preferably in the range of minus 20 to minus 30° F.

While, in the specification set out above, I have set forth steps of the process in considerable detail for the purpose of illustrating the invention, it will be understood that such details of operation may be varied widely by those skilled in the art without departing from the spirit of my invention.

I claim:

1. A process for preparing ice cream, comprising freezing an ice cream mixture containing water and solids in a colloidal mass and under agitation and aeration to produce a soft frozen body containing small crystals, hard freezing the crystals to substantially complete their growth at a temperature of minus 5° to plus 12° F., fracturing the crystals, kneading and dispersing the crystal fragments within the colloidal mass, and then subjecting the mass to temperatures below minus 20 to hard freeze the mass.

2. A process for preparing ice cream, comprising agitating and aerating an ice cream mixture containing water and solids in a colloidal mass while freezing the same to produce a soft frozen crystal mass, containing small crystals, hard freezing the crystals at a temperature of about 5 to 10° F. to substantially complete their growth, fracturing the crystals across the body of the mixture, kneading the crystal fragments and dispersing them throughout the colloidal mass, and then setting the mixture with the crystal fragments intermixed with the colloidal mass by bringing the temperature of the mixture substantially below zero.

3. A process for preparing ice cream, in which an ice cream mixture containing water and solids in a colloidal mass is frozen with agitation and aeration to produce a soft frozen crystal mass containing small crystals, hard freezing the crystals at a temperature between zero to 10° F., fracturing the hard crystals, kneading the mixture and dispersing the crystal fragments through the body of the mixture, and then quickly subjecting the mass to temperatures below minus 20° F. to hard set the mass.

References Cited in the file of this patent

UNITED STATES PATENTS 1,190,181    McCurdy   ---------- July 4, 1916